Patented May 5, 1942

2,281,941

UNITED STATES PATENT OFFICE 2,281,941

WAX MODIFYING AGENT

Eugene Lieber, Linden, N. J., assignor to Standard Oil Development Company, a corporation of Delaware No Drawing. Application December 11, 1937, Serial No. 179,280

7 Claims. (Cl. 196—78)

The present invention relates to the production of wax modifying agents which are useful for many purposes in which it is desired to insure the presence of small crystals in wax structure. For example, such materials are useful as pour point depressants for use in waxy lubricating oils and also for assistance in dewaxing wax containing oils. The method of making the depressants, their nature and use will be fully understood from the following description.

Heretofore wax modifying agents have been made chiefly by the aluminum chloride condensation of waxy hydrocarbons, and preferably by condensation thereof with cyclic compounds. It has now been found that somewhat similar materials can be produced more cheaply by condensation with certain acid condensation substances.

In making the said modifiers, wax is first halogenated preferably by the action of free chlorine to the extent of say 5 to 25% chlorine by weight. This is accomplished by melting the wax and blowing chlorine through at a temperature from say 150 to 300° F. Under such conditions a mixture of various chlorinated compounds is produced. It is preferable to limit the chlorination to about 10 to 12% in order to produce the maximum wax modifying activity, but it will be understood that the wax activity is still maintained even outside of the preferred limits given above.

The chlorinated wax is then dechlorinated, preferably by heating to a high temperature and permitting the hydrogen chloride to split off and escape. It is preferred to use a temperature below about 700° F. at which the wax, that is to say the carbon to carbon bonds thereof, is not decomposed and in this way a mixture of olefins is produced corresponding to the mixture of the chlorinated hydrocarbons and substantially none of the carbon to carbon bonds of the original wax has been broken. Such dechlorination may be obtained by heating to lower temperatures in the presence of catalysts such as anhydrous barium chloride or activated clay catalysts which have the power to split off hydrochloric acid at reduced temperatures.

While the above method of producing the unsaturated hydrocarbons is preferred, it will be understood that equivalent mixtures may be made by other means, for example by careful dehydrogenation. A totally cracked wax can also be used, i. e., a vapor phase cracked wax distillate in which there is rupture of the c—c bonds.

Polymerization is carried out in a liquid state by stirring for a prolonged period with a suitable acid polymerization catalyst. Non-volatile mineral acids, such as sulfuric and phosphoric, are suitable for the purpose. The acid should be of a concentration below 100% since this produces a considerably better pour point depressant. Concentrations as low as 50% have been used, but the action of acid catalysts so dilute is not as satisfactory as using the commercial acid, for example 60° or 66° Bé. Phosphoric acid and phosphoric anhydride may also be used; for example, commercial 85% phosphoric acid is satisfactory for the purpose, or mixtures of 85% phosphoric acid and phosphoric anhydride, although the more dilute acids may be used. The acid is preferably dropped slowly into the hydrocarbon mixture which is continuously stirred, and the introduction of the acid may take as long as an hour during which the stirring is continued and the temperature is controlled so as not to permit carbonization. The concentration of acid and temperature are interrelated to some extent. For example, with stronger acids it is preferred to maintain some of the lower temperatures, while with the weaker acids higher temperatures can be used. It is preferable not to go over about 250° F. in order to prevent carbonization and ordinarily the reaction can be conducted below 150° F. With acids as weak as 50%, however, temperatures up to 300° have been used without difficulty, but even with such dilute acids, it is preferred to use lower temperatures.

The time of reaction varies likewise with the temperature and acid concentration. It is considerably longer than is ordinarily used for straight acid treatment of oils, waxes and the like. Active depressants can be made from a concentrated acid at 120° F., with a reaction time of an hour, but more potent products are obtained by increasing the reaction time to five hours or more. With higher temperatures or stronger acids, the time may be proportionately decreased, just as it would be increased by the use of weaker acids. After the reaction period has elapsed, the acid is removed, for example by neutralization, and the hydrocarbon contents of the reaction mixture including the modifier are taken up in a suitable solvent which effects the separation from the acid materials. Neutralization may be carried out with caustic soda, and as an extraction agent kerosene may be employed to separate the hydrocarbon materials from the acid sludge. The final step of purification consists in distilling off the solvent and the lower boiling products, and the wax modifier is recovered as a distillation residue.

Wax modifiers can be made just as described above from waxy olefins alone, but they can also be made with the addition of cyclic materials, for example cyclic hydrocarbons such as benzol and toluene, but preferably naphthalene, anthracene, phenanthrene and the like. Similarly, phenolic materials may be used such as simple phenol, the naphthols, anthrols or alkylated phenols such as cresol. Aromatic amines can be used as well as aromatic esters or ethers. The esters may have the aromatic ring in either the acid or the alcoholic portion of the molecule, or a ring may be present in both radicals. Similarly, the ether may be a di-aromatic ether such as diphenyl ether or dinaphthyl ether or diphenyl oxide, but mixed aromatic aliphatic ethers may also be employed such as naphthyl phenyl or ethyl naphthyl. Aromatic ketones may be employed for this purpose as well, such as acetophenone, stearyl naphthyl ketone and the like.

The amount of the aromatic may vary considerably, but is preferably less than about 30% of the weight of the olefins to be condensed therewith. The conditions of temperature, time and catalyst strength are substantially the same as used above, although it has been found that the optimum conditions vary somewhat with the use of different compounds. These small variations cannot be accurately predicted, but it is found that they can be readily determined experimentally without difficulty.

The polymers produced according to the present invention are useful to reduce the pour point of waxy lubricating oils and for this purpose the material is added in relatively small proportions, say from about ½ to 5%, but usually 1% is sufficient for the purpose. These materials are used in similar quantities as wax modifiers to assist in the dewaxing of petroleum oils. The material may be added to the oil to be dewaxed prior to dilution with any suitable solvent such as naphtha, benzol, or mixed solvents such as acetone and benzol, many of which have been proposed.

The following is representative of the physical characteristics of a polymer produced with sulfuric acid from waxy olefins in the absence of aromatics:

A. P. I. gravity_____ 22.3
In Saybolt seconds, viscosity at 210°_____ 293
In Saybolt seconds, viscosity at 100°_____ 4262
Pour point _____°F__ +45
Conradson carbon_____per cent__ 6.1

The following examples are presented to illustrate the nature of the present modifying agents and the methods for producing the same:

Example I

Paraffin wax having a melting point of 122° F. was heated to 200° F. and blown with gaseous chlorine for several hours until 15% by weight of chlorine had been absorbed. This material was then dechlorinated by heating in the presence of anhydrous barium chloride to 650° F., until the evolution of hydrogen chloride had ceased.

To 800 cc. of waxy olefins prepared as above, 85 cc. of 95% sulfuric acid was added over a period of 90 minutes, during which the mixture was thoroughly agitated. The temperature rose spontaneously to 125° F. and the stirring was continued for 4½ hours after the entire amount of acid had been added.

The mixture obtained as above was then neutralized by adding 30% aqueous caustic soda until just neutral to phenolphthalein. The neutralized mixture was then extracted with 800 cc. of kerosene and 600 cc. of isopropyl alcohol were added. Solid $CO_2$ was also added in order to neutralize the slight alkalinity which was observed at this point.

The mixture was allowed to stand and three layers eventually formed. The lower or aqueous layer containing sodium sulfate was discarded. The second layer containing an alcoholic water was worked up to recover alcohol for reuse, while the upper or hydrocarbon layer was washed with brine to remove any traces of soaps and salts and was then distilled up to a temperature of 600° F., in order to remove the kerosene and the lower boiling waxy fractions. The depressant, which amounted to 288 cc. of viscous oil was recovered as a distillation residue. When 1% of this material was added to a waxy oil which had an initial pour point of 30° F., it was found to be reduced to +5° F.; 5% of the same material added to the same oil reduced its pour point to —20° F.

Example II

In the second experiment, carried out precisely as before, except that the amount of acid was doubled, the yield of the inhibitor increased from 36%, as in the first experiment, to 46%. On testing the potency of this inhibitor, it was found that 1% thereof produced the same depression as in Example I, but that 5% reduced the pour point of the oil from +30° F. to —25° F.

Example III

The following tests were made with a wax which had been recovered from a prior condensation and which was removed from the condensation product on distillation with the solvent. Tests were made for condensing this wax at different temperatures using 10% of a 95% sulfuric acid in each case with a reaction time of 4½ hours. The yield data and the potency of the depressor produced are given below:

| Temperature °F | 95 | 135 | 175 |
|---|---|---|---|
| Yield of residue above 600° F. per cent | 11.2 | 10.0 | 13.1 |
| Potency, 1% °F | —10 | —30 | —25 |
| Potency, 5% °F | —35 | —35 | —35 |

The above potency tests were all made using a waxy oil having an initial pour point of +30° F.

Example IV

In this experiment a dechlorinated wax obtained from a wax originally containing 15% chlorine was used. The same amount of a 95% sulfuric acid was used in all experiments and the time was varied from 1 to 5 hours. Using 1% of the polymer produced, potencies were tested in the same waxy oil. The product made using a one hour reaction time gave a pour point depression of 15°; that is to say from +30 to 15° F., while the material made using a five hour reaction in the same oil reduced the pour point from +30 to +5° F. When added in larger amounts, that is to say 5%, the product made with a one hour reaction time reduced the pour point of the oil from +30 to —15° F., but while using the product made from the longer reaction time, the pour point was reduced from +30 to —25° F.

Example V

To illustrate the use of aromatic materials in the manufacture of pour point depressants by the present method, condensations were carried out using naphthalene and phenol respectively. In each case 400 cc. of wax olefins obtained by dechlorinating a wax originally containing 10.5% chlorine were used and the amount of the aromatic material in each case was 50 grams. 100 cc. of 95% sulfuric acid were used for effecting the condensation. The acid was added for a one hour period and the total reaction time was five hours. The average temperature during condensation was 110° F. and in each case a maximum temperature of 120° was recorded. In the case where naphthalene was used, the yield amounted to 148 grams or about 37%, based on the weight of the dechlorinated wax alone. When phenol was used the yield was about 25% on the same basis.

The potency of these materials was tested in an oil having a +30° pour point originally, using 1% of the inhibitors. The one made from naphthalene gave a pour point of —10° F., while that from phenol gave 0° F. When 5% was employed, the product made from naphthalene gave a pour point of —15° F., while that from phenol —10° F.

Example VI

Paraffin wax was chlorinated to 12% chlorine content by weight. It was then heated to 650° F., until the evolution of hydrogen chloride ceased. To 400 cc. of the olefinic material were added 100 cc. of 85% phosphoric acid, the temperature being adjusted to 150° F. The acid was added continuously over a period of one hour, in drops, while the material was continually stirred. After the addition of the acid, the mixture was held at 150° F. for four hours. Caustic soda was then added to approximate neutrality and 500 cc. of kerosene and isopropyl alcohol were added, and the material which was now slightly alkaline was neutralized with solid $CO_2$. The mixture settled in three layers, the lower one being aqueous, the middle alcoholic and the upper oily. This latter was removed and distilled with fire and steam up to a temperature of 600° F., so as to remove the solvent and wax. 38.4 grams of a heavy polymer oil were recovered as residue. When 1% of this material was added to a waxy oil having a pour point of +30° F., the pour point was reduced to —5° F. When 5% was added the pour point was reduced to —20° F.

Example VII

The following example will illustrate the use of dilute sulfuric acid of 50% concentration.

Paraffin wax was chlorinated to 11% chlorine content by weight. It was then heated to 650° F., until the evolution of hydrogen chloride ceased. To 400 cc. of the olefinic material were added 163 cc. of 50% sulfuric acid (85 cc. of 95% $H_2SO_4$ diluted to 163 cc. with water), the temperature being adjusted to 125–130° F. The dilute acid was added continuously over a period of one hour, in drops, while the material was continually stirred. After the addition of the acid, the mixture was held below 150° F. for four hours. Caustic soda was then added to approximate neutrality and 500 cc. of kerosene and isopropyl alcohol added, and the material which was now slightly alkaline was neutralized with $CO_2$. The mixture was settled and the kerosene layer removed and distilled with fire and steam up to a temperature of 600° F., so as to remove the solvent and wax. 73.3 grams of a heavy oil were recovered as residue. When 1% of this material was added to waxy oil having a pour point of +30° F., the pour point was reduced to +20° F. When 5% was added, the pour point was reduced to +5° F.

Example VIII

The experiment described in Example VII above was repeated exactly except that a reaction temperature of 200° F. was maintained. As in Example VII, 50% sulfuric acid in water was used as the condensing agent. The product was recovered as before and 62.5 grams of a heavy polymer oil were recovered as residue. When 1% of this material was added to a waxy oil having a pour point of +30° F., the pour point was reduced to +10° F. When 5% was added, the pour point was reduced to —5° F.

Examples VII and VIII therefore demonstrate that when using diluted sulfuric acid as the condensing agent, a higher temperature of reaction will produce more potent pour depressor agents.

Example IX

The experiment described in Example VII was repeated exactly except that 75% sulfuric acid (85 cc. of 95% $H_2SO_4$ diluted to 108 cc. with water) was used as the condensing agent. A reaction temperature below 150° F. was maintained for 4 hours. The product was recovered as described in Example VII and 88.1 grams of a heavy polymer oil were recovered. When 1% of this material was added to a waxy oil having a pour point of +30° F., the pour point was reduced to —5° F.

Example X

Filtered paraffin-wax of 122° F. melting point was cracked by heating to 800–900° F. under 45 pounds pressure and an overhead condensate was recovered. This crude condensate was redistilled and the fraction boiling in the range from 400–500° F. at atmospheric pressure was used in the subsequent step.

To 525 cc. of the olefinic material, prepared as described above, was added 80 cc. of 95% sulfuric acid, the temperature being allowed to rise spontaneously, a maximum temperature of 115° F. being reached. The acid was added continuously over a period of one hour, while the material was continually stirred. After the addition of the acid, the mixture was held below 115° F. for 4 hours. Caustic soda was then added to approximate neutrality and 500 cc. of kerosene and isopropyl alcohol were added, and the material which was now slightly alkaline was neutralized with solid $CO_2$. The mixture was settled and the kerosene layer removed and distilled with fire and steam to 600° F., so as to remove the solvent and wax. 45.4 grams of a heavy polymer oil were recovered as residue. When 1% of this material was added to a waxy oil having a pour point of +30° F., the pour point was reduced to +5° F. When 5% was added, the pour point was reduced to —10° F.

The present invention is not to be limited to any theory of the mechanism of the reaction, but only to the following claims in which it is desired to claim all novelty inherent in the invention.

I claim:

1. An improved process for producing wax modifiers which comprises contacting olefins in the liquid state derived from wax and having substantially the same number of carbon atoms per molecule as wax hydrocarbons, with an aqueous acid catalyst selected from the group consisting of sulfuric and phosphoric acids, of about 50–100% concentration, at a temperature of 95–300° F., for a reaction time of about 1–5 hours, using a volume of acid equal to about 10–25% of the volume of the liquid olefins, separating the acid and recovering from the resultant polymerization product a fraction having pour-depressing properties which is substantially non-volatile during fire and steam distillation up to 600° F. of a kerosene solution thereof.

2. Process according to claim 1 in which the olefins used are obtained by chlorinating paraffin wax to a chlorine content of 5–25% by weight and dechlorinating the resultant product with heat at a temperature below 700° F.

3. Process according to claim 1 in which the arithmetic product of the % concentration of the acid times the °F. of the temperature is not substantially above 15,000.

4. Process according to claim 1 in which a cyclic compound is present and is reacted with the olefins.

5. Process according to claim 1 carried out in the presence of an aromatic compound selected from the group consisting of mono- and di-nuclear aromatic compounds, the amount of said aromatic compounds being less than about 30% of the weight of the olefins.

6. An improved process for producing wax modifiers for use as pour depressants in wax-containing lubricating oils which comprises chlorinating paraffin wax at a temperature of about 150–300° F. until about 10–15% by weight of chlorine is combined chemically in the wax, dechlorinating the resultant product with heat at a temperature below about 700° F. to produce a mixture of olefins containing substantially the same number of carbon atoms per molecule as in the original wax, contacting said olefin mixture in the liquid state with an aqueous sulfuric acid catalyst of about 50–100% concentration at a temperature of about 110–250° F., for a reaction time of about 1–5 hours, using a volume of acid equal to about 10–25% of the volume of the liquid olefins, neutralizing the resultant polymerization product with aqueous caustic soda, extracting the neutralized product with kerosene and distilling the resultant kerosene solution up to 600° F. with fire and steam, to remove kerosene and low boiling materials, thereby leaving as a residue a heavy oil polymerization product having the property of reducing the pour point of wax-containing hydrocarbon oils.

7. Process according to claim 6 in which the polymerization step is carried out in the presence of an amount of naphthalene less than about 30% of the weight of the olefins used.

EUGENE LIEBER.